United States Patent
Cervenka

(10) Patent No.: US 8,768,832 B2
(45) Date of Patent: Jul. 1, 2014

(54) FINANCIAL TRANSACTION FUNDS COLLECTION AND DISTRIBUTION

(75) Inventor: Karen L. Cervenka, Belmont, CA (US)

(73) Assignee: Visa U.S.A. Inc., San Francisco, CA (US)

(*) Notice: Subject to any disclaimer, the term of this patent is extended or adjusted under 35 U.S.C. 154(b) by 0 days.

(21) Appl. No.: 11/935,802

(22) Filed: Nov. 6, 2007

(65) Prior Publication Data

US 2009/0119208 A1   May 7, 2009

(51) Int. Cl.
*G06Q 40/00* (2012.01)

(52) U.S. Cl.
USPC .................................. 705/40; 705/4

(58) Field of Classification Search
USPC ............................................... 705/4
See application file for complete search history.

(56) References Cited

U.S. PATENT DOCUMENTS

| | | | |
|---|---|---|---|
| 4,858,121 A * | 8/1989 | Barber et al. | 705/2 |
| 5,265,008 A * | 11/1993 | Benton et al. | 705/44 |
| 5,381,477 A * | 1/1995 | Beyers et al. | 380/231 |
| 5,704,044 A | 12/1997 | Tarter et al. | |
| 5,920,847 A * | 7/1999 | Kolling et al. | 705/40 |
| 6,044,362 A * | 3/2000 | Neely | 705/40 |
| 6,208,973 B1 * | 3/2001 | Boyer et al. | 705/2 |
| 7,716,132 B1 * | 5/2010 | Spies et al. | 705/42 |
| 2002/0111916 A1 | 8/2002 | Coronna et al. | |
| 2002/0133459 A1 | 9/2002 | Polk et al. | |
| 2003/0046227 A1 * | 3/2003 | Yamagishi et al. | 705/40 |
| 2004/0215560 A1 * | 10/2004 | Amalraj et al. | 705/40 |
| 2004/0215564 A1 * | 10/2004 | Lawlor et al. | 705/40 |
| 2005/0125342 A1 | 6/2005 | Schiff | |
| 2006/0149595 A1 * | 7/2006 | Williams et al. | 705/2 |
| 2007/0005403 A1 | 1/2007 | Kennedy et al. | |
| 2008/0010096 A1 * | 1/2008 | Patterson et al. | 705/4 |
| 2009/0106143 A1 * | 4/2009 | Gustave et al. | 705/39 |

OTHER PUBLICATIONS

International Search Report and Written Opinion for PCT/US2008/082572 mailed Jul. 9, 2009.
International Preliminary Report on Patentability for PCT/US2008/082572 issued May 11, 2010.

* cited by examiner

*Primary Examiner* — William Rankins
(74) *Attorney, Agent, or Firm* — Jones Day

(57) ABSTRACT

There is provided financial transaction funds collection and distribution methodology and system. A financial service provider assists in providing information to a third party transaction processor, who is engaged to process financial transactions such as insurance claims. Payors enroll as participants with the financial service provider, and information about the payors' banks, funding sources, or other financial institutions are linked to the payors in a database maintained by the payment system. Once a payor and the payor's financial institution are enrolled, funds may be obtained from the payor's bank by the financial service provider on behalf of the third party transaction processor, and without transaction-by-transaction involvement from the payor, significantly reducing the time, expense, and costs associated with financial transaction collection and payment.

19 Claims, 3 Drawing Sheets

FINANCIAL TRANSACTION FUNDS COLLECTION AND DISTRIBUTION

BACKGROUND

The collection of receivable accounts and distribution of funds to pay invoices are tasks inherent to any business venture. Over time, electronic payment and automated account withdrawal methods have become available to help ease the transaction costs and efforts involved in collecting and making payments. In some industries, however, despite the availability of electronic funds transfers, the collection and payment process is particularly time and effort intensive. This is especially the case in those industries in which collections and payments are being handled by a third party agency where insurance claims are involved, and where guarantors may be self-insured, insured through a third party, or both. The health care industry is one such example, where a single visit to a health care provider initiates a cascade of financial transactions that are designed to settle and pay at least a portion of the doctor's bill.

For an example illustrating one common but complex collection and payment methodology, consider the prior art health care payment process 100 depicted in FIG. 1. A employee (EE) of an employer (ER) who is an insured party 110 is a patient (or provides insurance benefits to the patient by familial relationship to) who seeks care from a doctor or other health care provider 120, and as an initial step before treatment, provides 115 health insurance information to the health care provider 120. The provider 120 then renders 107 a service to the patient 110, resulting in a bill or invoice being sent 122 to a third party Health Care Plan Administrator (HCPA) 130, or other entity that is designated by the patient's health insurance as the point of contact for initiating a claim or request for payment. The HCPA 130 then determines the correct address for a guarantor, typically the patient's employer 140, which may commonly be self-insured, and forwards 131 the claims and/or fund requests to the employer 140. The employer 140, if it has not already done so, deposits 141 funds into a bank or other financial institution 150, and sends 142, payment information such as account electronic fund transfer information to the HCPA 130, enabling the HCPA 130 to obtain funds to satisfy the claim. Using the information furnished by the employer 140, the HCPA then contacts the employer's bank 150, via an electronic funds transfer process 132, in order to obtain funds to remunerate the health care provider 120. In response, the bank 150 transfers 143 the funds to an account specified by the HCPA 130, and in turn, the HCPA 130 can provide a payment 123 to health care provider 120 to settle the bill or invoice.

While the process 100 provides for payment of health care-related bills, it does so with a significant amount of overhead. For example, each time a claim needs to be paid, the HCPA 130 needs to determine who to contact to obtain funding, to submit a request for instructions, to wait for the employer 140 to return the instructions on where to obtain the funding, then needs to contact the funding source such as the bank financial institution 150 to obtain funds. Further, the employer 140 may be contacted numerous times by third party processors requesting instructions for payment for medical invoices, adding increased overhead expense.

As a single visit to a health care provider 120 results in a large number of financial transactions, a more efficient method would be desirable to help reduce the inescapable impact of passing overhead expenses to increasingly financially burdened and time constrained employees 110. What is needed, then, is a method to improve efficiency of prior art collections processing. What is also needed is a method to automate collection of funds without continued involvement of a guarantor. What is further needed is an approach to collect and store information about guarantors and their associated banks, financial institutions, or funding sources.

SUMMARY

A financial transaction funds collection and distribution methodology and system are provided. A financial service provider assists in providing information to a third party transaction processor, who is engaged to process financial transactions such as insurance claims. A collection of client employers (also known as, and used interchangeably herein as, "guarantors" or "payors"), enroll as participants with the financial service provider. One implementation includes furnishing information about the payor's bank, funding sources, or other financial institutions. In another implementation, enrollment by a payor includes a request by the payor to the payor's bank or financial institution to contact the financial service provider to enroll as the payor's funding source. Once the payor and its financial institution are enrolled, funds may be obtained from the payor's bank by the financial service provider on behalf of the third party transaction processor, and without transaction-by-transaction involvement from the payor. For example, but not by way of limitation, the third party transaction processor receives a list of participating client employers from the financial service provider, and if a claim received by the third party transaction processor identifies the payor as one of the participating client employers, the third party transaction processor may contact the financial service provider to obtain funds from the payor's bank on behalf of the third party transaction processor.

In yet another implementation, a financial service provider receives a request to effect payment for a financial transaction, such as invoice or medical bill, from a third party transaction processor (TPTP) such as a health care plan administrator. The request includes settlement account information that identifies and describes the TPTP's account that will be used to receive funds, a remittance amount that is required to settle the financial transaction, and identification information that identifies the responsible payor/guarantor/employer.

Once the financial institution (such as the employer's bank) receives the request, a database is searched by the financial service provider to attempt to find a record that includes the payor/employer identification information. If a record is found that matches the payor identification information, information sufficient to identify a funding source associated with the payor (for example, but not by way of limitation, the payor's bank and the payor's account number at the bank) is obtained from the record.

A statement is assembled that indicates a request for funds from the payor's funding source is forthcoming, and the amount to be requested is the remittance amount. The statement may, in one implementation, include the payor identification information, information regarding the payment source, the remittance amount, and date information (such as time and date) regarding when funds are to be withdrawn from the funding source. Then the financial service provider prepares a message to the funding source requesting an amount of funds sufficient to cover the remittance amount, and also prepares a message to the TPTP's settlement account manager (such as the TPTP's bank), indicating a request to receive funds in an amount commensurate with the remittance amount. By then electronically transmitting the messages (such as through an electronic funds transfer (EFT)

process), the financial service provider effects the collection of funds and distribution to the TPTP.

In a still further implementation, a third party transaction processor (TPTP) receives a directory including at least one participating payor, and receives an invoice from a merchant that includes the merchant's identity information, a remittance amount required to pay the invoice; and a responsible payor's identification information. In a further implementation, the payor's identification information does not include any information regarding the payor's bank, financial institution or funding source. The TPTP checks the directory to determine whether the identification information regarding the responsible payor appears in the directory. If the payor's information is available in the directory, the TPTP then creates a request to effect payment for the invoice that includes the TPTP's identity and settlement account information, the remittance amount required to pay the invoice, and the responsible payor's identification information. The TPTP may then send this information to the financial service provider, and in return, receive funding to cover the amount of the bill or invoice.

Various features and advantages of the invention can be more fully appreciated with reference to the detailed description and accompanying drawings that follow.

DESCRIPTION OF THE DRAWINGS

Exemplary implementations will become more apparent from the detailed description set forth below when taken in conjunction with the drawings, in which like elements bear like reference numerals.

DETAILED DESCRIPTION

Figure 2:
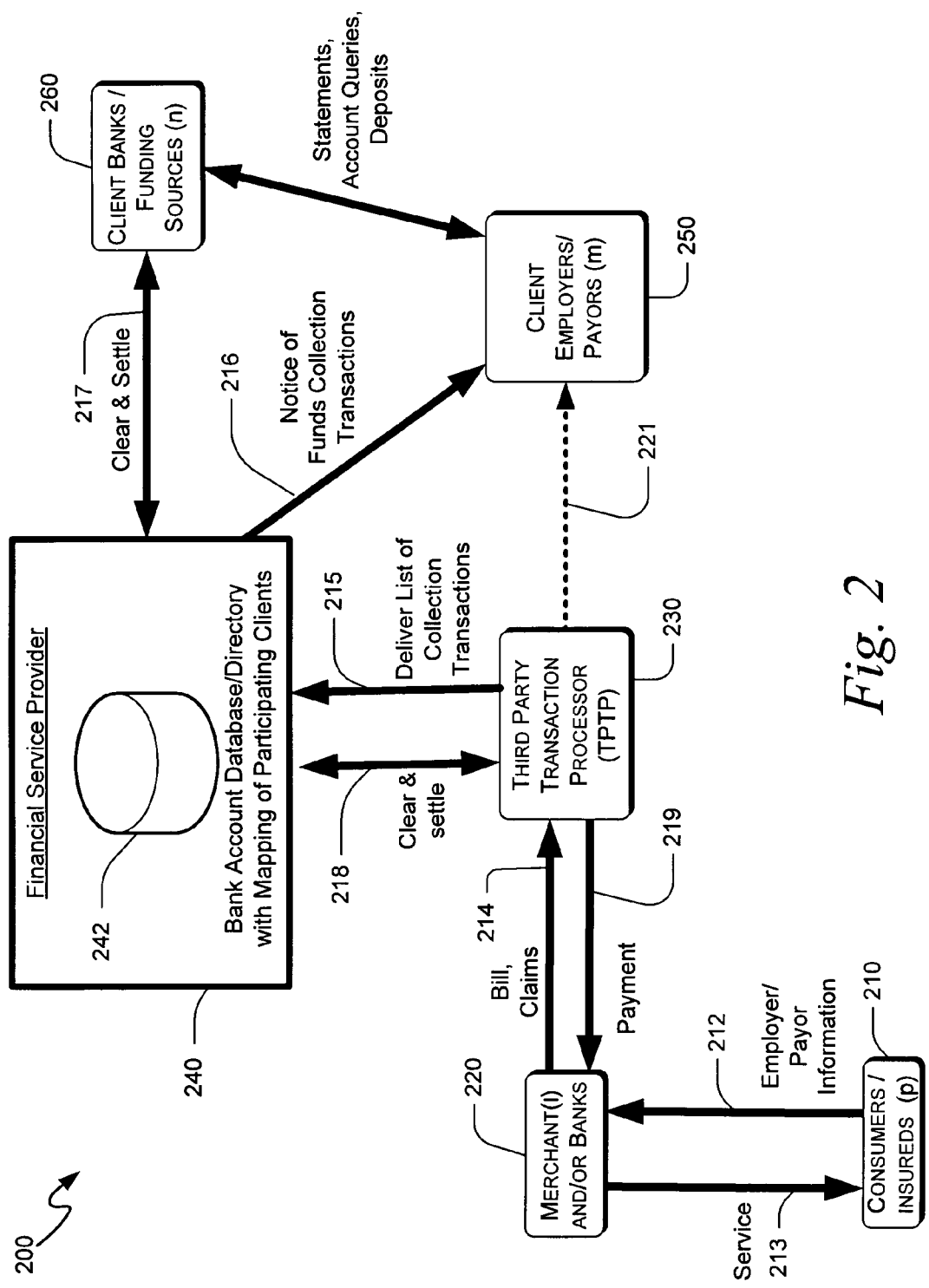
FIG. 2 depicts a block diagram of an exemplary implementation of a financial transaction funds collection and distribution system.

A block diagram for an exemplary implementation of a financial transaction collection and distribution system 200 as seen in FIG. 2. Consumers and/or insureds 210 (where p may represent 1 or more consumers or insureds) submit employer/payor information to a merchant 220 (where l may represent 1 or more merchants), such as a health care provider. The consumer/patient/insureds 210 receive a service 213 such as a medical test or a healthcare provider office visit, and the merchant 220 submits 214 an invoice, bill, and/or insurance claim to a third party transaction processor (TPTP) 230 for payment. In one implementation, the TPTP 230 compares the information furnished by the merchant 220 with a list or directory 242 of participating clients previously furnished by a financial service provider 240. Upon finding that the responsible payor for the invoice/bill/claim furnished by the merchant 220 appears within the participating client directory 242, the TPTP 230 prepares a communication such as an electronic message addressed to the financial service provider 240. The communication may be ultimately transmitted to the financial service provider 240 through approaches such as electronic mail transmissions sent through an electronic network connecting the financial service provider 240 with the TPTP 230.

Figure 1:
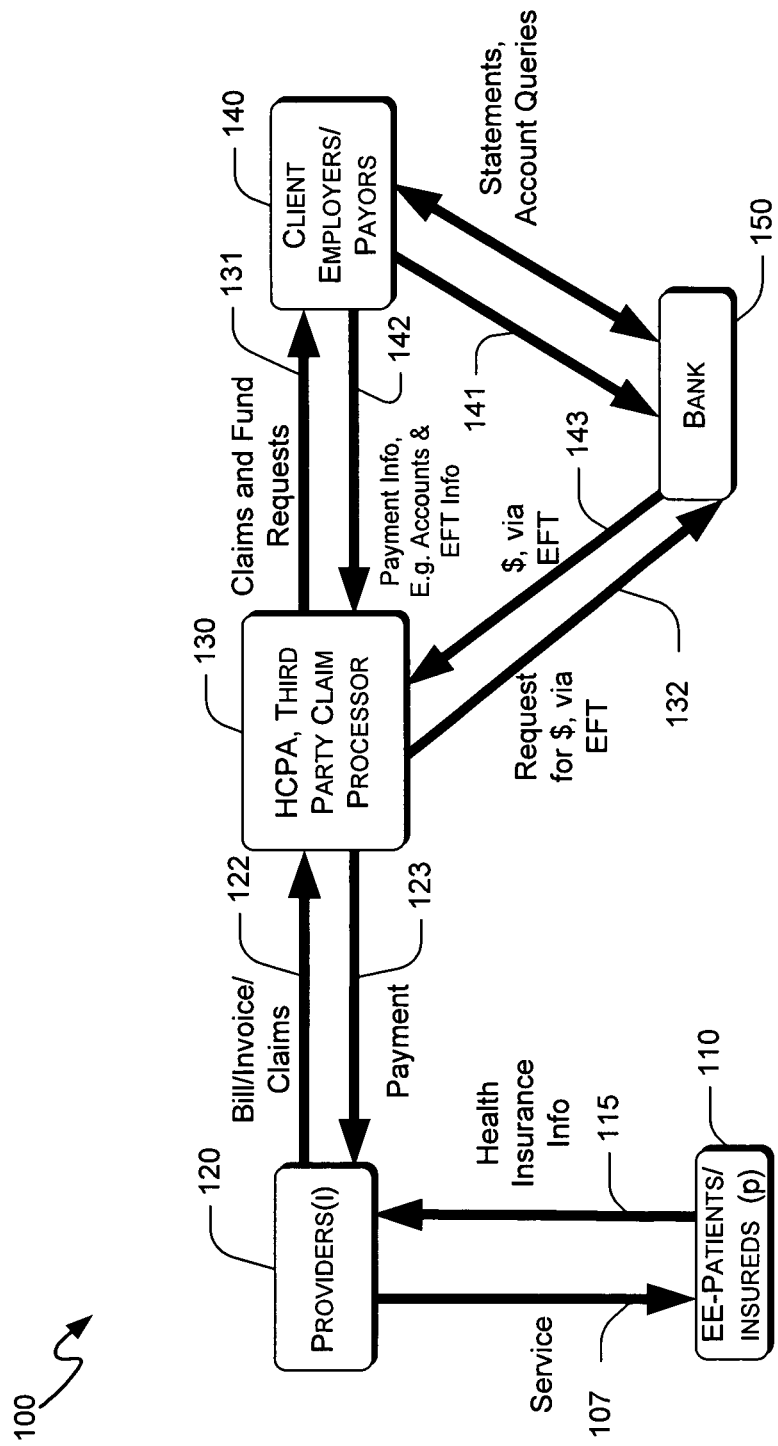
FIG. 1 depicts a prior art block diagram illustrating one common health care funds collection and distribution system.

The communication contains, in one implementation, settlement account information for the TPTP 240, (such as the TPTP's bank and bank account number), a remittance amount required to settle the financial transaction that was billed 214 by the merchant 220; and identification information regarding a responsible payor 250 (where m may represent 1 or more client employers, guarantors, or payors). In one implementation, the TPTP 230 may perform an internal lookup in a database (not shown) maintained by the TPTP 230, to determine what payor is responsible to pay the bill/invoice submitted by the merchant 220 for payment of the service rendered to the consumer 210. However, unlike the prior art diagram shown in FIG. 1, the TPTP 230, in one implementation, need not know the participating client's 250 bank information in order to initiate the collection and payment process. Rather, the TPTP 230 submits 215 the communication to the financial service provider 240 to obtain payment to furnish to the merchant 220, and the funds are obtained by the financial service provider 240 without the need for the TPTP's 230 direct involvement in collection from the funding source 260 (where n may represent 1 or more banks, funding sources, or financial institutions). This is possible, in part, through a pre-enrollment process whereby the client employers/payors 250, either of their own accord or at the request of the TPTP 230, contact the financial service provider 240 to enroll as a participating client/payor. This enrollment includes furnishing information about the payor's bank(s), funding sources (s), or financial institution(s) 260 to the financial service provider, so that the banking information (such as the bank's identification information and the payor's 250 account number at the bank 260) are linked by the financial service provider 240 within the financial service provider 240's database 242. In another implementation, to enroll the bank 260, the payor 250 instructs the bank 260 to contact the financial service provider 240 and enroll itself as a funding source for the payor 250, including necessary information such as the payor's 250 identifying information, the bank's 260 identifying information, and the payor's 250 account number at the bank 260. Once a payor 250 and its financial institution 260 are enrolled, the financial service provider may, in one implementation, include the payor's identifying information in the directory of participating clients that is distributed to the TPTP 230.

In one implementation, the TPTP 230 collects 214 a plurality of bills, claims, or invoices, and formats a single communication containing a plurality of funding collection requests that are to be furnished 215 to the financial service provider 240 for processing in batch mode. Whether a single transaction collection request is made, or a request representing multiple transactions is sent 215 to the financial service provider 240, after receiving the communication the financial service provider 240 compares the identifying information for one or more payor(s) 250 furnished by the TPTP 230 to records stored within a database 242 that the financial service provider 240 maintains. If a match is found for the submitted payor 250, the financial service provider 240 obtains the payor's 250 funding source 260 identifying information that was linked to the payor 250 at the time of its enrollment. Using the account number and identifying information furnished to the financial service provider 240 in regards to the payor 250 extracted from the database 242, the financial service provider 240 may then prepare and send 217 a message addressed to the payor's 250 funding source 260, requesting payment for the bill/invoice/claim submitted 214 by the merchant 220. The funding source 260, in return, transfers 217 funds to the financial service provider 240 in a manner indicated within the communication that was sent by the financial service provider 240 to the funding source 260. The financial service provider 240, in one implementation, prepares a statement 216 to be sent to the payor 250, summarizing the transactions incurred or to be incurred by the funding source 260 on the payor's 250 behalf, allowing the payor 250 to ensure that adequate funds are maintained in the payor's 250 account at the funding source 260.

Once the financial service provider 240 receives the funds provided by the funding source 260, the financial service provider 240 prepares another communication message such as an electronic message, indicating that the funds are to be transferred 218 to the settlement account specified by the TPTP 230 to cover the costs of the bill or invoice submitted 214 by the merchant 220. The TPTP 230 may then send 219 payment to the merchant 220 in fulfillment of the invoice.

As a benefit of a present implementation, the TPTP 230 did not need to directly contact 221 the payor 250 regarding collection of payment. Without the need to continually obtain funding source 260 information to collect payment for financial transactions, significant efficiencies are achieved. Further efficiencies may be achieved through implementations whereby the financial service provider 240 automates through a computer system connected to a network and database, the processes for request receipt 215, lookup of appropriate enrolled funding source 260, transfer of request for funds and receipt of funds 217, generation and transmission of a collection statements to payors 250, and settlement of payment 218 with the TPTP 230, who, in one implementation, is electronically linked to the financial service provider 240 through a computer network.

Figure 3:
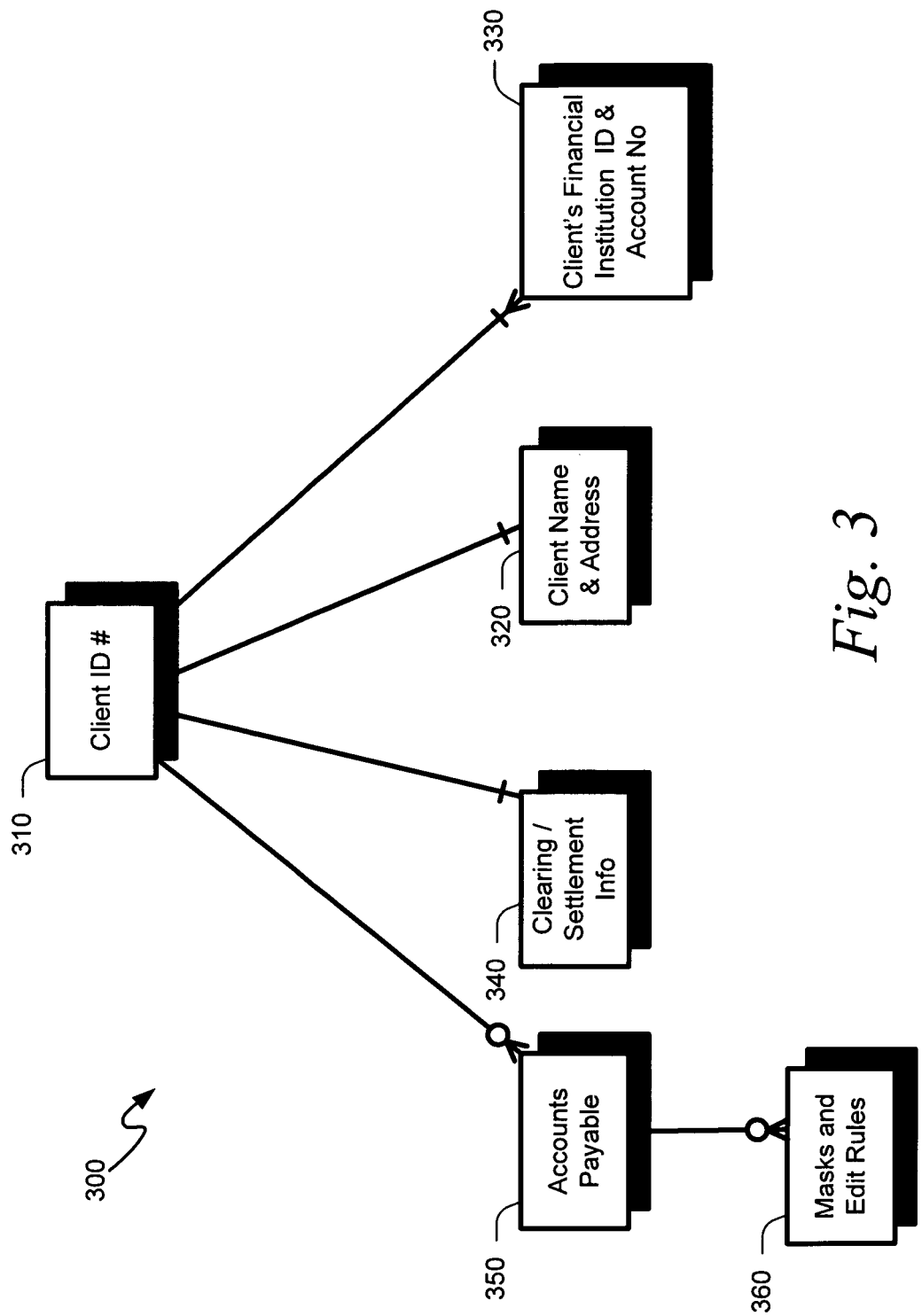
FIG. 3 illustrates an exemplary database information schema for an exemplary database shown in FIG. 2.

Turning to FIG. 3, an exemplary schema 300 is shown illustrating exemplary data structures used within the financial service provider's database 242 seen in FIG. 2. A key field (Client ID #) 310 represents a unique identifier corresponding to a particular payor 250 that is enrolled as a participant. The key field 310 is linked to a number of subordinate fields including zero or more accounts payable fields 350, a clearing and settlement information field 340, a client name and address field 320 and one or more financial institutions 330, including the identifying information of the funding sources 260 that are to be used to obtain payment to satisfy a particular collection request, where the payor 250 is the responsible party. Also included in the schema 300 are zero or more mask and edit rule fields 360 linked to the accounts payable field 350. By way of example, and not by way of limitation, the edits could include dollar amount edits (minimum, maximum), Payor NPI, Provider NPI, claim ID, trace number, and claim adjustments. Those of skill in the relevant arts appreciate that schema 300 may be implemented in a conventional database structure typical of a relational database.

The steps of a method, process, or algorithm described in connection with the implementations disclosed herein may be embodied directly in hardware, in a software module executed by a processor, or in a combination of the two. The various steps or acts in a method or process may be performed in the order shown in FIG. 2 may be performed in another order. Additionally, one or more process steps may be omitted or one or more process steps may be added to the processes. An additional step, block, or action may be added in the beginning, end, or intervening existing elements of such processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A machine processor-implemented method comprising:
   receiving, at a financial service provider from a payor-to-merchant transaction processor (P2MTP) for a healthcare provider, a batch request to effect payment for a batch of financial transactions between the healthcare provider and an insured for healthcare provided to the insured by the healthcare provider, the batch request including:
      a P2MTP settlement account for receiving payment;
      a remittance amount required to settle the batch of financial transactions; and
      payor identification information regarding a payor that is financially responsible to the healthcare provider for the batch of financial transactions;
   searching, within a database located at the financial service provider, for a record matching the payor identification information; and
   operative when said record is found:
      determining by the processor, based on a record in the financial service provider database, payment source information sufficient to identify a funding source associated with the payor, wherein the funding source is associated with an account issued to the payor and is the account from which the payment will be made;
      extracting, the determined payment source information from the financial service provider database;
      transmitting, a statement from the financial service provider for delivery to an address of the payor, wherein the statement indicates that a request for payment will be made and includes:
         the payor identification information;
         the payment source information;
         the remittance amount; and
         date information regarding when the payment will be withdrawn;
      transmitting, from the financial service provider for delivery to an address of the funding source, a collection electronic message that includes a request for payment of the remittance amount;
      transmitting a remitting electronic message from the financial service provider for delivery to an address of the P2MTP, wherein the remitting electronic message indicates that the remittance amount is to be transferred to the P2MTP settlement account;
   clearing and settlement of the batch of financial transactions, by the financial service provider, with the funding source; and
   clearing and settlement of the batch of financial transactions, by the financial service provider, with the P2MTP.

2. The method as defined in claim 1, wherein the P2MTP settlement account information includes P2MTP identity information.

3. The method as defined in claim 1, wherein the payor identification information record within the database further comprises:
   a payor identifier;
   an institution identifier corresponding to a financial institution utilized by the payor; and
   at least one account number identifying an account residing at the financial institution.

4. The method as defined in claim 3, wherein the payor identification information record within the database further comprises:
   data regarding accounts payable; and information regarding clearance and settlement for financial transactions regarding the at least one account number.

5. The method as defined in claim 1, wherein the payor is the funding source.

6. The method as defined in claim 1, wherein the payment source information further comprises:
   a financial institution identifier identifying a financial institution associated with the payor; and
   an account identifier associated with a payment account.

7. The method as defined in claim 1, further comprising receiving, from the funding source:
   a request to enroll the funding source in the database;
   the payor identification information;
   an institution identifier corresponding to a financial institution utilized by the payor; and
   at least one account identifier for an account corresponding to the financial institution, said account being associated with the payor.

8. The method as defined in claim 1, further comprising receiving, from the payor:
   a request to enroll the funding source in the database;
   the payor identification information;
   an institution identifier corresponding to a financial institution utilized by the payor; and
   at least one account identifier for an account corresponding to the financial institution, said account being associated with the payor.

9. The method as defined in claim 1, further comprising:
   operative if a record matching the payor identification information does not reside within the database:
   forming a rejection message addressed to the P2MTP wherein the message includes:
     a notice that the payor has not enrolled as a participating payor; and
     instructions regarding enrollment procedures to enroll the corresponding payor.

10. The method as defined in claim 1, wherein the batch request to effect payment for a batch of financial transactions from the P2MTP includes a plurality of remittance amounts and respective payor identification information.

11. The method as defined in claim 1, wherein:
    the batch of financial transactions is a batch of medical invoices;
    the P2MTP is a heath care plan administrator;
    the P2MTP settlement account is a health care plan administrator settlement account;
    the remittance amount is a remittance amount required to pay the medical invoice;
    the payor identification information identifies an employer of the insured; and
    the merchant is a health care provider.

12. A non-transitory computer readable media storing processor-issuable instructions to:
    receive, electronically, at a financial service provider from a payor-to-merchant transaction processor (P2MTP) for a healthcare provider, a batch request to effect payment for a batch of financial transactions between the healthcare provider and an insured for healthcare provided to the insured by the healthcare provider, the batch request including:
      a P2MTP settlement account for receiving payment;
      a remittance amount required to settle the batch of financial transactions; and
      payor identification information regarding a payor that is financially responsible to the healthcare provider for the batch of financial transactions;
    search, electronically, within a database located at the financial service provider, for a record matching the payor identification information; and
    operative when said record is found:
      determine, electronically by a processor, based on a record in the financial service provider database, payment source information sufficient to identify a funding source associated with the payor, wherein the funding source is associated with an account issued to the payor and is the account from which the payment will be made;
      extract, electronically, the determined payment source information from the financial service provider database;
      transmit, electronically, a statement from the financial service provider for delivery to an address of the payor, wherein the statement indicates that a request for payment will be made and includes:
        the payor identification information;
        the payment source information;
        the remittance amount; and
        date information regarding when the payment will be withdrawn;
      transmit, from the financial service provider for delivery to an address of the funding source, a collection electronic message that includes a request for payment of the remittance amount;
      transmit a remitting electronic message from the financial service provider for delivery to an address of the P2MTP, wherein the remitting electronic message indicates that the remittance amount is to be transferred to the P2MTP settlement account;
    clear and settlement of the batch of financial transactions, by the financial service provider, with the funding source; and
    clear and settlement of the batch of financial transactions, by the financial service provider, with the P2MTP.

13. An apparatus comprising:
    computer implemented means for receiving, at a financial service provider from a payor-to-merchant transaction processor (P2MTP) for a healthcare provider, a batch request to effect payment for a batch of financial transactions between the healthcare provider and an insured, wherein the batch request includes:
      P2MTP identity information;
      P2MTP settlement account for receiving payment;
      a remittance amount required to settle the batch of financial transactions; and
      payor identification information regarding a payor that is financially responsible to the healthcare provider for the batch of financial transactions;
    computer implemented means for determining by a processor, based on a record in a financial service provider database, payment source information regarding a funding source associated with the payor, wherein the funding source is associated with an account issued to the payor and is the account from which the payment will be made;
    computer implemented means for searching within a database for a payor record matching the payor identification information, wherein the database comprises a plurality of payor records, and, if said payor record is found, extracting the determined payment source information from the financial service provider database;
    computer implemented means for transmitting, from the financial service provider for delivery to an address of the payor, a statement that includes a request for a payment that indicates that a request for payment will be made and includes:
the payor identification information;
the payment source information;
the remittance amount; and
date information regarding when the payment will be withdrawn;
computer implemented means for transmitting two electronic messages from the financial service provider to respectively collect and remit the payment, wherein the two electronic messages include:
a collect payment message for delivery to an address of the funding source and requesting payment for the remittance amount; and
a remit payment message for delivery to an address of the P2MTP and indicating that the remittance amount is to be transferred to the P2MTP settlement account;
computer implemented means for clearing and settlement of the batch of financial transactions, by the financial service provider, with the funding source; and
computer implemented means for clearing and settlement of the batch of financial transactions, by the financial service provider, with the P2MTP.

14. The apparatus as defined in claim 13, further comprising computer implemented means for transmitting:
the collect payment message addressed to the funding source associated with the payor; and
the remit payment message addressed to the P2MTP.

15. The apparatus as defined in claim 13, wherein the database is managed by a financial service provider.

16. The apparatus as defined in claim 13, wherein each said payor record further comprises:
a name and address of each said payor;
an institution identifier corresponding to a financial institution utilized by each said payor; and
at least one account number identifying an account residing at each said financial institution.

17. The apparatus as defined in claim 13, wherein the database further comprises:
data regarding accounts payable; and
information regarding clearance and settlement for each financial transaction for each said payor.

18. The apparatus as defined in claim 13, wherein the batch request to effect payment for a batch of financial transactions from the P2MTP includes a plurality of remittance amounts and respective payor identification information.

19. The apparatus as defined in claim 13, wherein:
the batch of financial transactions is a batch of medical invoice;
the P2MTP is a health care plan administrator;
the P2MTP settlement account is a health care plan administrator settlement account;
the remittance amount is a remittance amount required to pay the medical invoices;
the payor identification information identifies an employer of the insured; and
the merchant is a health care provider.

* * * * *